US008723643B2

(12) United States Patent
Wang et al.

(10) Patent No.: US 8,723,643 B2
(45) Date of Patent: May 13, 2014

(54) METHOD AND COMPUTER PROGRAM PRODUCT OF SWITCHING LOCKED STATE OF ELECTRONIC DEVICE

(75) Inventors: John C. Wang, Taoyuan (TW); Fu-Chiang Chou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 865 days.

(21) Appl. No.: 12/887,239

(22) Filed: Sep. 21, 2010

(65) Prior Publication Data

US 2011/0080260 A1 Apr. 7, 2011

(30) Foreign Application Priority Data

Oct. 1, 2009 (TW) .............................. 98133445 A (51) Int. Cl.
| G05B 19/00 | (2006.01) |
| H04Q 9/00 | (2006.01) |
| G06F 3/033 | (2013.01) |
| G06K 9/00 | (2006.01) |
| G05B 23/00 | (2006.01) |

(52) U.S. Cl.
USPC ....... 340/5.83; 340/5.82; 340/5.52; 340/5.73; 340/3.43; 340/568.1; 345/160; 345/173; 345/177; 382/124; 382/118; 726/17; 726/20; 726/28

(58) Field of Classification Search
USPC ............ 340/5.83, 5.82, 5.52; 455/411, 556.2
See application file for complete search history.

(56) References Cited

U.S. PATENT DOCUMENTS

| 6,111,977 A * | 8/2000 | Scott et al. .................... 382/124 |
| 6,141,436 A * | 10/2000 | Srey et al. .................... 382/124 |
| 6,310,610 B1 | 10/2001 | Beaton et al. |
| 6,678,821 B1 * | 1/2004 | Waugh et al. .................. 713/168 |
| 7,051,204 B2 * | 5/2006 | Pitsos ............................ 713/168 |
| 7,356,706 B2 * | 4/2008 | Scheurich ..................... 713/186 |
| 7,616,194 B2 | 11/2009 | Yang et al. |
| 2003/0152254 A1 * | 8/2003 | Ha et al. ........................ 382/124 |
| 2005/0264840 A1 * | 12/2005 | Niitsuma ..................... 358/1.14 |
| 2006/0075250 A1 | 4/2006 | Liao |
| 2007/0150842 A1 | 6/2007 | Chaudhri et al. |
| 2008/0098214 A1 * | 4/2008 | Rodriguez Martinez et al. ............................. 713/156 |

(Continued)

FOREIGN PATENT DOCUMENTS

| CN | 101021762 | 8/2007 |
| CN | 100350368 | 11/2007 |

(Continued)

OTHER PUBLICATIONS

European Search Report for European Patent Application No. 10012867.7, Jan. 7, 2011.

*Primary Examiner* — Fekadeselassie Girma
(74) *Attorney, Agent, or Firm* — Kirton McConkie; Evan R. Witt (57) ABSTRACT

In a method of switching a locked state of an electronic device with a user-verifying function, a biologic feature data from a user is captured while receiving an input from the user for an operation when the electronic device is in a locked state. Whether the biologic feature data conforms to a reference biologic feature data is then determined. If it is determined that the biologic feature data conforms to the reference biologic feature data, the electronic device is switched from the locked state into a non-locked state and directly controls the electronic device to perform the operation according to the input when the biologic feature data is determined conforming to the reference biologic feature data.

13 Claims, 5 Drawing Sheets

(56) References Cited

U.S. PATENT DOCUMENTS

| | | |
|---|---|---|
| 2008/0117176 A1 | 5/2008 | Ko et al. |
| 2008/0117177 A1 | 5/2008 | Ko et al. |
| 2008/0117178 A1 | 5/2008 | Ko et al. |
| 2008/0117188 A1 | 5/2008 | Ko et al. |
| 2008/0122801 A1 | 5/2008 | Ko et al. |
| 2009/0140982 A1 | 6/2009 | Chen et al. |
| 2009/0141951 A1 | 6/2009 | Ogo et al. |
| 2009/0160609 A1 | 6/2009 | Lin et al. |
| 2010/0323664 A1* | 12/2010 | Sivaram et al. ............... 455/411 |

FOREIGN PATENT DOCUMENTS

| | | |
|---|---|---|
| EP | 0593386 A2 | 9/1993 |
| EP | 1942398 A1 | 7/2008 |
| TW | 200715193 | 4/2007 |
| TW | 200823717 | 6/2008 |
| TW | 200919255 | 5/2009 |
| WO | 2007/046466 A1 | 10/2006 |
| WO | 2007002029 A2 | 1/2007 |
| WO | 2009042392 | 4/2009 |

* cited by examiner

METHOD AND COMPUTER PROGRAM PRODUCT OF SWITCHING LOCKED STATE OF ELECTRONIC DEVICE

FIELD OF THE INVENTION

The present invention relates to a method and a computer program product of switching a locked state, and more particular to a method and a computer program product of switching a locked state while receiving an input from a user for an operation. The present invention also relates to an electronic device whose locked state is optionally switched while receiving an input from a user for an operation.

BACKGROUND OF THE INVENTION

In consideration of information security, it is more and more common to impart a user-verifying function to an electronic device, and more particularly to a portable device such as USB drive, smart phone, notebook computer, personal digital assistant (PDA), etc., which is subject to loss. Generally, the user-verifying function is performed by way of biologic feature check, e.g. fingerprint check.

Figure 1A:
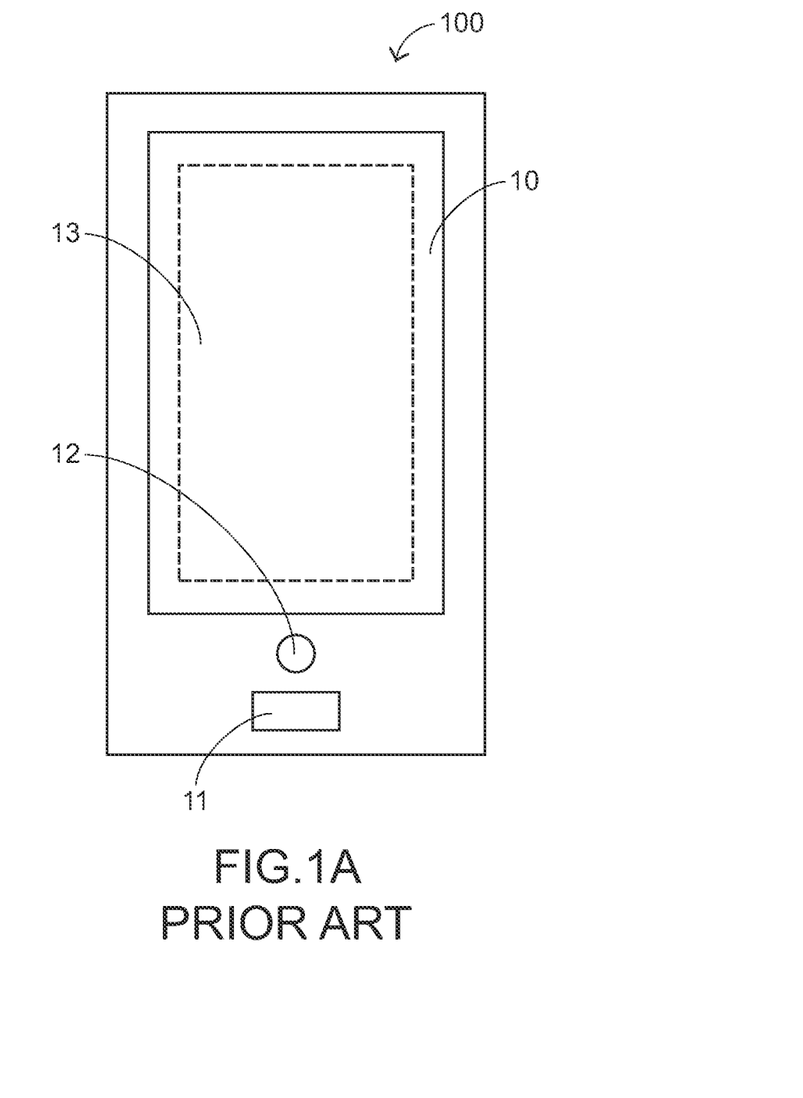
FIG. 1A is a schematic diagram showing the appearance of a smart phone.
Figure 1B:
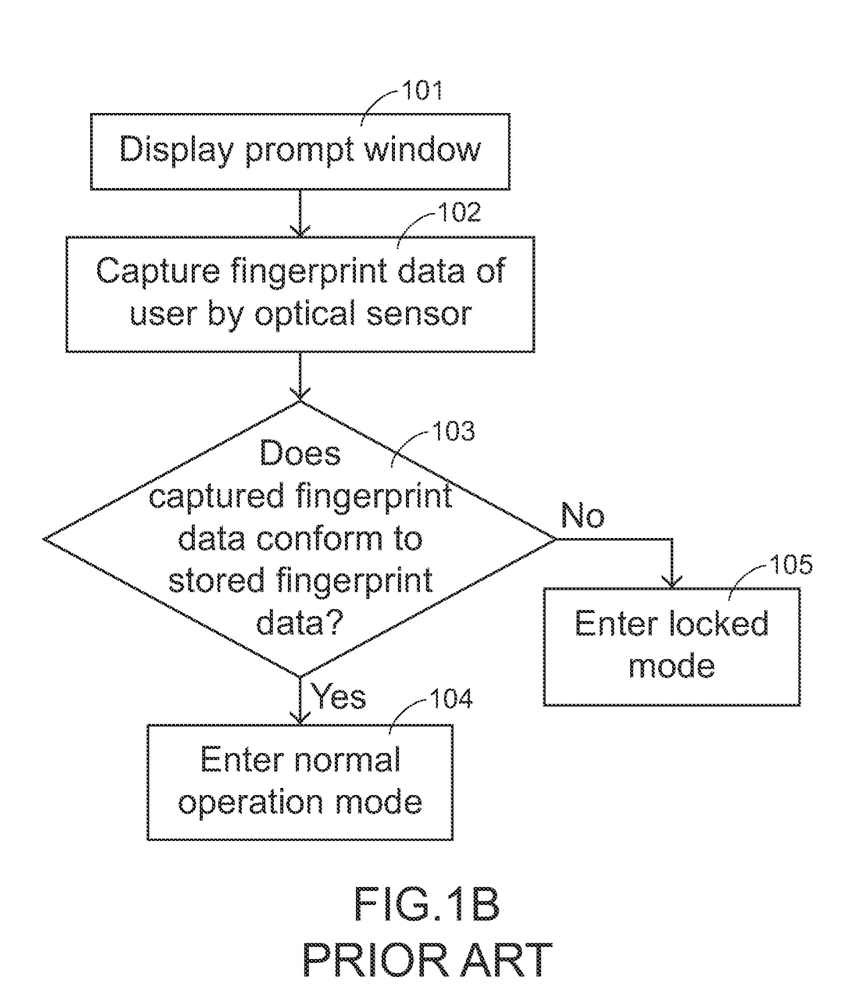
FIG. 1B is a flowchart illustrating a conventional fingerprint-verifying process applied to the smart phone of FIG. 1A.

Please refer to FIG. 1A, which schematically shows the appearance of a smart phone, and FIG. 1B, which illustrates the flowchart of a conventional fingerprint-verifying process applied to the smart phone. After a user switches on the power of the smart phone 100 and a booting process is executed, a prompt window pops up on the display 10 (Step 101), instructing the user to perform fingerprint check through an optical sensor 11 disposed on the phone 100. After the optical sensor 11 finishes scanning the user's fingerprint and acquires a corresponding fingerprint data (Step 102), the fingerprint data is compared with a previously stored fingerprint data (Step 103). If a comparable result is obtained, the smart phone enters a normal operation mode (Step 104) so as to allow the user to normally operate the phone 100. Thus the user may input commands via a push button 12 as shown in FIG. 1A or the display 10 when it is a touch screen. On the contrary, if the acquired fingerprint data does not conform to the previously stored fingerprint data, the smart phone 100 enters a locked mode so that the input means is disabled from normal command input (Step 105).

As the fingerprint-verifying procedure has to be conducted to unlock the phone before a user may successfully operate the phone, it is troublesome and time-consuming to general users.

SUMMARY OF THE INVENTION

Therefore, an object of the present invention is to simplify a user-identifying process of electronic device in order to improve the utilization rate of a user-identifying function for information security of the electronic device.

In an aspect of the present invention, a method of switching a locked state of an electronic device with a user-verifying function is provided. In the method, a biologic feature data from a user is captured while receiving an input from the user for an operation when the electronic device is in a locked state. Whether the biologic feature data conforms to a reference biologic feature data is then determined. If it is determined that the biologic feature data conforms to the reference biologic feature data, the electronic device is switched from the locked state into a non-locked state and directly controls the electronic device to perform the operation according to the input when the biologic feature data is determined conforming to the reference biologic feature data.

In another method of switching a locked state of an electronic device with a user-verifying function according to the present invention, a biologic feature data from a user is captured while receiving an input from the user for an operation when the electronic device is in a non-locked state. Whether the biologic feature data conforms to a reference biologic feature data is then determined. If the biologic feature data is not determined conforming to the reference biologic feature data, the electronic device is switched from the non-locked state into a locked state and prohibited from performing the operation according to the input.

In another aspect of the present invention, an electronic device is provided. The electronic device includes: an input module configured to capture a first biologic feature data from a first user while receiving a first input from the first user for a first operation; a determining module, coupled to the input module, configured to determine whether the first biologic feature data conforms to a reference biologic feature data; and a control module, coupled to the determining module, configured to switch the electronic device from the locked state into a non-locked state, and directly control the electronic device to perform the first operation according to the first input when determining module determines the first biologic feature data conforms to the reference biologic feature data.

In another electronic device according to the present invention, an input module, a determining module and a control module are included, wherein the input module is configured to capture a biologic feature data from a user while receiving an input from the user for an operation of the electronic device when the electronic device is in a non-locked state; the determining module is coupled to the input module and configured to determine whether the biologic feature data conforms to a reference biologic feature data; and the control module is coupled to the determining module and configured to switch the electronic device from the non-locked state into a locked state and prohibit the electronic device from performing the operation according to the input when the determining module determines the biologic feature data does not conform to the reference biologic feature data.

In a further aspect of the present invention, a computer-readable medium having stored thereon instructions is provided. The instructions, when executed by a processor in an electronic device, cause the processor to perform operations of: capturing a biologic feature data from a user while receiving an input from the user for an operation when the electronic device is in a locked state; determining whether the biologic feature data conforms to a reference biologic feature data; and switching the electronic device from the locked state into a non-locked state and directly controlling the electronic device to perform the operation according to the input when the biologic feature data is determined conforming to the reference biologic feature data.

In another computer-readable medium having stored thereon instructions according to the present invention, the instructions, when executed by a processor in an electronic device, cause the processor to perform operations of: capturing a biologic feature data from a user while receiving an input from the user for an operation when the electronic device is in a non-locked state; determining whether the biologic feature data conforms to a reference biologic feature data; and switching the electronic device from the non-locked state into a locked state and prohibiting the electronic device from performing the operation according to the input when the biologic feature data is not determined conforming to the reference biologic feature data.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 2A:
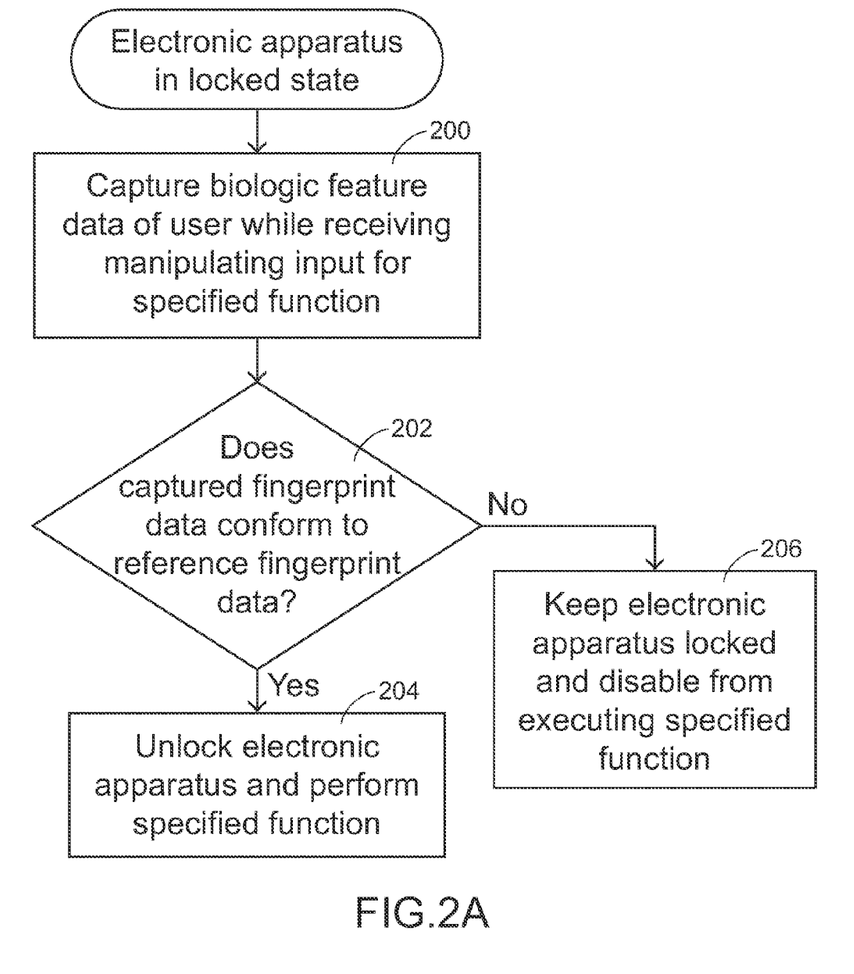
FIG. 2A is a flowchart illustrating a method for switching an operational state of an electronic device with a biologic-feature-verifying function according to an embodiment of the present invention.

Please refer to FIG. 2A, which is a flowchart illustrating a method of switching a locked state of an electronic device with a biologic-feature-verifying function according to an embodiment of the present invention. The electronic device, for example, can be a computer, a PDA, a mobile phone, a multimedia player, a game console, a digital camera or any other electronically lockable electronic device.

In the embodiment illustrated in FIG. 2A, the electronic device is preset to be locked until a user passes the verification. When the electronic device is locked, partial or all functions of the electronic device are disabled. Take a mobile phone for example. When the mobile phone is locked, it may lock only one or more functions of making a phone call, sending a message, checking phone-call records, checking mailbox, etc. Alternatively, it is also feasible to lock all the operational functions of the mobile phone. When the electronic device receives an input for an operation from an arbitrary user, a biologic feature of the user is captured at the same time and a biologic feature data to be verified is generated (Step 200). The biologic feature to be captured can be but is not limited to one or more of fingerprint, voiceprint, speech contents, palm print, iris image or face configuration. The biologic feature data to be verified is then compared with a reference biologic feature data for user verification to determine the conformity (Step 202). Whether the biologic feature data to be verified conforms to the reference biologic feature data can be determined according to a variety of criteria. For example, for highly security requirement, the conformity has to be highly confirmed. If the biologic feature data to be verified conforms to the reference biologic feature data, the electronic device is switched from the locked state into a non-locked state so that the operation can be performed directly according to the input (Step 204). Meanwhile, some or all the other operations of the electronic device are enabled, depending on settings. For example, only the functions of making a phone call and sending a message are enabled but all the other functions including checking phone-call records and checking mailbox are still disabled. In another example, which parts of functions are to be enabled can be preset based on users. In other words, some user(s) is(are) allowed to check phone-call records and/or mailbox but others are not permitted. On the other hand, if it is not determined that the biologic feature data conforms to the reference biologic feature data in Step 202, the electronic device keeps locked and is prohibited from performing the operation (Step 206). By way of user verification, the information of the electronic device can be secured.

In an example that the electronic device is a mobile phone with a touch screen, a user may conduct a manipulating input by way of the touch screen with his finger even when the mobile phone is in a locked state. While the user's finger is moving on the touch screen to execute a specified function such as scrolling a picture, the user's fingerprint data is captured and compared with the previously stored reference fingerprint data. Alternatively, the user may put his finger on the optical sensor to be scanned so that the mobile phone in the locked state may capture the user's fingerprint data and compare it with the reference fingerprint data. If the two fingerprint data are comparable, the locked state of the mobile phone is cleared so that the picture-scrolling function is performed. On the other hand, if the current user's fingerprint data does not conform to the reference fingerprint data, the mobile phone is still in the locked state. That is, the picture-scrolling function will not be performed.

In another example that the electronic device is a mobile phone with a voice control mechanism, a user may conduct an operation with his voice even when the mobile phone is in a locked state. While the user speaks to execute a specified function such as making a phone call, the user's voice print data is captured by a voice-identifying module and compared with the previously stored reference voice print data. If the two voice print data are comparable, the locked state of the mobile phone is cleared so that the calling function is performed. On the other hand, if the current user's voice print data does not conform to the reference voice print data, the mobile phone is still in the locked state. That is, no phone call could be made.

In this way, an authorized user whose biologic feature data has been registered is capable of using the mobile phone in the locked state without additional operation to unlock the phone. In contrast, an unauthorized user whose biologic feature data was not recorded cannot operate the phone as the phone remains in the locked state. In other words, conventional user-verification conducted through a specific verifying procedure can be exempted from for an authorized user, while information can still be secured from an unauthorized user.

In the above embodiments associated with FIG. 2A, the electronic device keeps locked if there is no biologic feature data of the current user recorded (Step 204). Nevertheless, the phone may execute an alternative verifying procedure after Step 204. For example, a pin number or a specific input is requested for verification. For a smart phone, for example, a virtual key pad may be provided on a touch screen for the user to input a pin number or an input area may be provided on a touch screen for the user to input a literal or symbolic signature. If the user passes the alternative verifying operation, the electronic device can be unlocked. Otherwise, the electronic device remains locked.

Figure 2B:
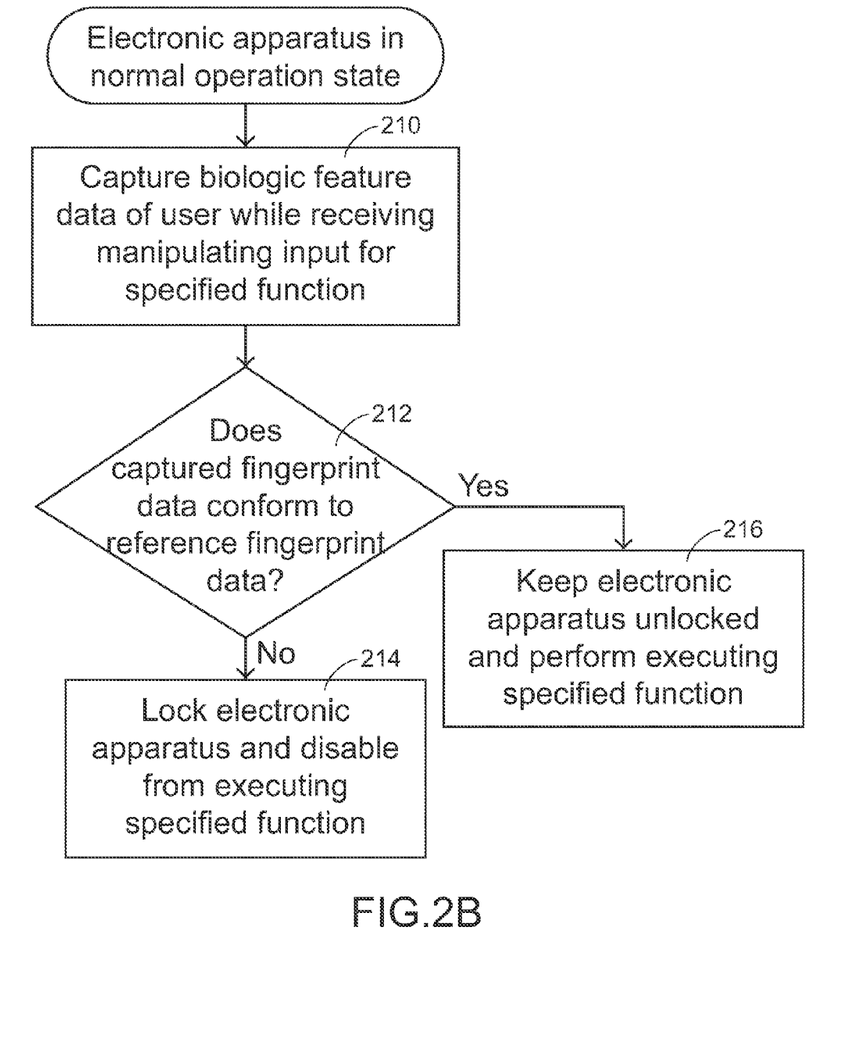
FIG. 2B is a flowchart illustrating a method for switching an operational state of an electronic device with a biologic-feature-verifying function according to another embodiment of the present invention.

In another embodiment illustrated in the flowchart of FIG. 2B, the electronic device is preset to be a non-locked state until an unauthorized user is detected. When the electronic device receives an input for an operation from an arbitrary user, a biologic feature of the user is captured at the same time and a biologic feature data to be verified is generated (Step 210). The biologic feature data to be verified is compared with a previously stored reference biologic feature data for user verification to determine the conformity (Step 212). If the biologic feature data fails in the user verification, i.e. the biologic feature data to be verified does not conform to the reference biologic feature data, the electronic device is switched from the non-locked state to a locked state and is prohibited from performing the operation (Step 214). On the other hand, if the biologic feature data passes the user verification, i.e. the biologic feature data to be verified conforms to the reference biologic feature data, the electronic device remains in the non-locked state and the operation is performed directly according to the input (Step 216).

In an example that the electronic device is a mobile phone with a touch screen, a user may conduct a manipulating input by way of the touch screen with his finger when the mobile phone is in an unlocked state. While the user's finger is moving on the touch screen to execute a specified function such as scrolling a picture, the user's fingerprint data is captured and compared with the previously stored reference fingerprint data. Alternatively, the user may put his finger on the optical sensor to be scanned so that the mobile phone in the unlocked state may capture the user's fingerprint data and compare it with the reference fingerprint data. If the two fingerprint data are comparable, the picture-scrolling function is successfully performed. On the other hand, if the current user's fingerprint data does not conform to the reference fingerprint data, the mobile phone enters a locked state. That is, the picture-scrolling function will not be performed.

In another example that the electronic device is a mobile phone with a voice control mechanism, a user may conduct an operation with his voice when the mobile phone is in a locked state. While the user speaks to execute a specified function such as making a phone call, the user's voice print data is captured by a voice-identifying module and compared with the previously stored reference voice print data. If the two voice print data are comparable, the calling function is successfully performed. On the other hand, if the current user's voice print data does not conform to the reference voice print data, the mobile phone enters a locked state. That is, no phone call could be made.

In this way, an authorized user whose biologic feature data has been registered is capable of using the mobile phone in the non-locked state of the phone. In contrast, an unauthorized user whose biologic feature data was not recorded cannot operate the phone as the phone enters a locked state. In other words, conventional user-verification conducted through a specific verifying procedure can be exempted from for an authorized user, while information can still be secured from an unauthorized user.

In the above embodiments associated with FIG. 2B, the electronic device is locked if there is no biologic feature data of the current user recorded (Step 214). However, the phone may execute an additional verifying procedure after Step 214. For example, a pin number or a specific input is requested for verification. For a smart phone, for example, a virtual key pad may be provided on a touch screen for the user to input a pin number or an input area may be provided on a touch screen for the user to input a literal or symbolic signature. If the user passes the additional verifying operation, the electronic device can be unlocked. Otherwise, the electronic device remains locked.

For advanced security, the verifying procedures as illustrated in FIGS. 2A and 2B can be combined and executed periodically. For example, in a certain period after a user has been verified and the electronic device is unlocked in the embodiment of FIG. 2A, the electronic device performs the verifying procedure of the FIG. 2B embodiment in order to avoid subsequent use of the electronic device by an unauthorized user. Of course, it is possible to execute the FIG. 2A or FIG. 2B procedure again to re-check the adequacy of the locked or non-locked state of the electronic device. The repetitive verifying actions can be done at intervals or triggered by a specific operation.

The reference biologic feature data described above can be previously stored in the electronic device. Alternatively, the reference biologic feature data can also be previously stored in a remote device, e.g. a data server accessible via Internet. Then the reference biologic feature data can be acquired via Internet to be compared with.

Figure 3:
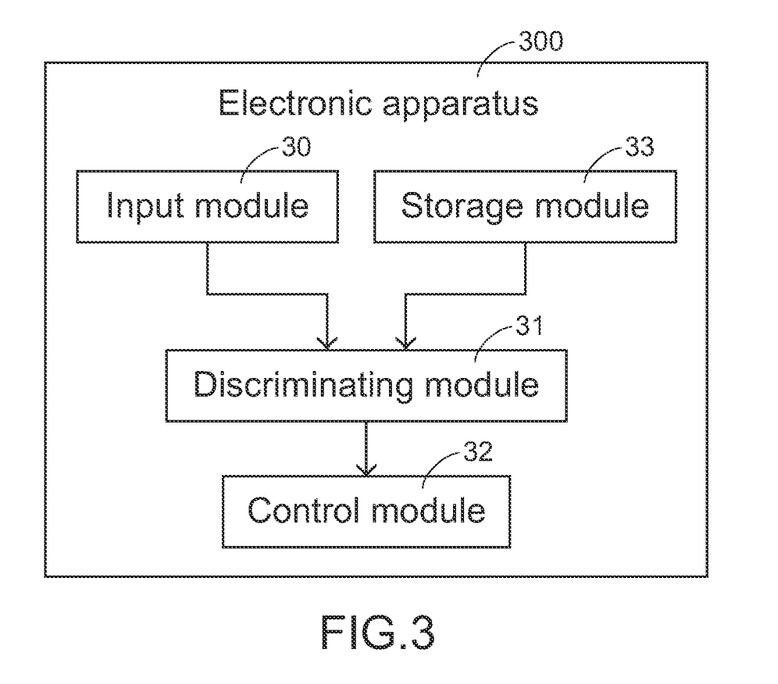
FIG. 3 is a functional block diagram illustrating an electronic device according to an embodiment of the present invention.

Please refer to FIG. 3, which illustrates an embodiment of electronic device according to the present invention, capable of switching states as described above. Examples of the electronic device 300 include, but are not limited to, a computer, a PDA, a mobile phone, a multimedia player, a game console, a digital camera or any other electronically lockable electronic device.

In the embodiment as shown in FIG. 3, the electronic device 300 includes an input module 30, a determining module 31, a control module 32 and a storage module 33. The storage module 33 is used for storing the reference biologic feature data for user verification, and may be omitted if a remote device accessible by the electronic device is used for storing the reference biologic feature data. The remote device, for example, can be a data server accessible via Internet. The input module 30 is used for receiving the input from a user and capturing the user's biologic feature data. In practice, the input module 30 can be implemented with an optical sensor which may capture fingerprint data, palm print data and/or iris image data; a touch screen which may capture fingerprint data and/or palm print data; a voice-identifying module such as a microphone, which may capture voice print data or speech contents; or an image-identifying module such as a camera, which may capture face configuration data. The determining module 31 is coupled to the input module 30 and the storage module 33 for determining the conformity between the captured biologic feature data and the reference biologic feature data. The control module 32 is coupled to the determining module 31 for optionally switching the locked/non-locked state of the electronic device 300 according to the determining result of the determining module 31. If the captured biologic feature data conforms to the reference biologic feature data, the electronic device is unlocked so that the operation is directly performed according to the input. On the contrary, if the captured biologic feature data is not determined conforming to the reference biologic feature data, the electronic device is locked so that the operation corresponding to the input cannot be performed.

Figure 4:
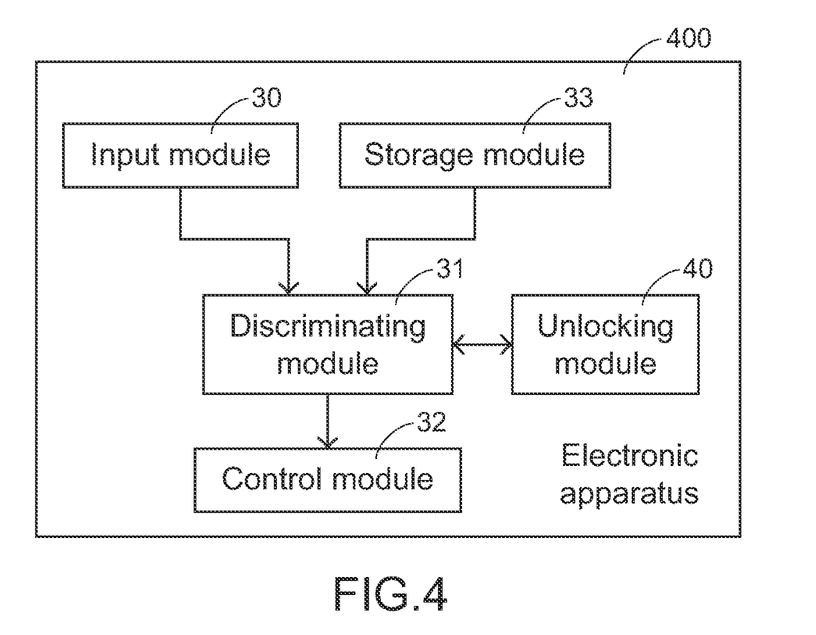
FIG. 4 is a functional block diagram illustrating an electronic device according to another embodiment of the present invention.

The determining module 31 and the control module 32 can be implemented with microprocessors or digital signal processors. While the user is conducting the input via the input module 30 with his finger, palm, eyeball or voice, the user's biologic feature data is captured at the same time. There is no need for the user to perform any additional user-verifying procedure to acquire the biologic feature data. With the comparison of the captured biologic feature data with the reference biologic feature data, whether the state should be changed or not can be determined. As for the operational details of the modules, they are appreciable from the associated steps described with reference to FIG. 2A and FIG. 2B, and not redundantly described herein Please refer to FIG. 4, which illustrates another embodiment of electronic device according to the present invention, capable of switching states as described above. The electronic device 400 as shown in FIG. 4, similar to the electronic device 300 as shown in FIG. 3, includes an input module, a determining module, a control module and an optional storage module, and further includes an unlocking module 40. The unlocking module 40 is coupled to the determining module 31. When the determining module 31 determines that the captured biologic feature data does not conform to the reference biologic feature data so that the electronic device 400 is locked, the unlocking module 40 provides an alternative way to unlock the electronic device 400. The unlocking module 400, for example, can be a physical push button, a touch screen and/or a touch pad, from which a pin number or other unlocking input can be made. Once the input passes the verification, the unlocking module 40 unlocks the electronic device 400. Otherwise, the electronic device 400 remains locked.

The method for switching a locked state as described above can be executed in a variety of electronic device in a form of computer instructions. The computer instructions can be digital data recorded in a computer readable medium such as an optical disc, a memory card or a USB drive, and when executed by a processor in an electronic device, cause the processor to perform operations of: capturing a biologic feature data from a user while receiving an input from the user for an operation when the electronic device is in a locked state; determining whether the biologic feature data conforms to a reference biologic feature data; and switching the electronic device from the locked state into a non-locked state and directly controlling the electronic device to perform the operation according to the input when the biologic feature data is determined conforming to the reference biologic feature data. Alternatively or additionally, The computer instructions, when executed by a processor in an electronic device, cause the processor to perform operations of: capturing a biologic feature data from a user while receiving an input from the user for an operation when the electronic device is in a non-locked state; determining whether the biologic feature data conforms to a reference biologic feature data; and switching the electronic device from the non-locked state into a locked state and prohibiting the electronic device from performing the operation according to the input when the biologic feature data is not determined conforming to the reference biologic feature data.

It is understood from the foregoing that according to the present invention, an authorized user can be verified at the same time that an input from the user for an operation is conducted. Meanwhile, the user may normally operate the electronic device. On the contrary, an input from an unauthorized user for an operation cannot unlock the electronic device or will result in the switching from a non-locked state into a locked state of the electronic device. In this way, the electronic device is secured from an unauthorized user.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of switching a locked state of an electronic device with a user-verifying function, comprising:
    capturing a first biologic feature data of a first user from a first input from the first user for a first operation while receiving the first input when the electronic device is in a locked state;
    determining whether the first biologic feature data conforms to a reference biologic feature data;
    switching the electronic device from the locked state into a non-locked state and directly controlling the electronic device to perform the first operation according to the first input when the first biologic feature data is determined conforming to the reference biologic feature data;
    capturing a second biologic feature data from a second user while receiving a second input from the second user for a second operation after the electronic device is switched to the non-locked state;
    determining whether the second biologic feature data conforms to the reference biologic feature data; and
    switching the electronic device from the non-locked state into the locked state and prohibiting the electronic device from performing the second operation according to the second input when the second biologic feature data is not determined conforming to the reference biologic feature data.

2. The method of claim 1, wherein the first biologic feature data comprises at least one of fingerprint data, voiceprint data, speech contents data, palm print data, iris image data, and face configuration data.

3. The method of claim 1, wherein the first biologic feature data is captured by at least one of an optical sensor, a touch screen, a voice-identifying module, and an image-identifying module.

4. The method of claim 1, wherein at least one of functions of the electronic device is disabled when the electronic device is in the locked state, and at least one of the disabled functions of the electronic device is enabled when the electronic device is in the non-locked state.

5. The method of claim 1, wherein the reference biologic feature data is stored in the electronic device or a remote device accessible by the electronic device.

6. The method of claim 1, wherein the electronic device remains in the locked state when the first biologic feature data is not determined conforming to the reference biologic feature data, and the method further comprises:
    executing an alternative user-verifying procedure when the first biologic feature data is not determined conforming to the reference biologic feature data.

7. The method of claim 6, wherein the alternative user-verifying procedure comprises:
    receiving an unlocking input; and
    switching the electronic device from the locked state into the non-locked state when the unlocking input conforms to a specific data.

8. The method of claim 7 wherein the unlocking input comprises at least one of a password, a literal signature and a symbolic signature.

9. An electronic device, comprising:
    an input module, configured to capture a first biologic feature data of a first user from a first input from a the first user for a first operation while receiving a the first input;

a determining module, coupled to the input module, configured to determine whether the first biologic feature data conforms to a reference biologic feature data;

a control module, coupled to the determining module, configured to switch the electronic device from the locked state into a non-locked state, and directly control the electronic device to perform the first operation according to the first input when the determining module determines the first biologic feature data conforms to the reference biologic feature data the input module is configured to capture a second biologic feature data from a second user while receiving a second input from the second user for a second operation after the electronic device is switched to the non-locked state;

the determining module is further configured to determine whether the second biologic feature data conforms to the reference biologic feature data; and the control module is further configured to switch the electronic device from the non-locked state into the locked state and prohibit the electronic device from performing the second operation according to the second input when the determining module determines the second biologic feature data does not conform to the reference biologic feature data.

10. The electronic device of claim 9 wherein the input module comprises at least one of an optical sensor, a touch screen, and a microphone.

11. The electronic device of claim 9 wherein the biologic feature data comprises at least one of fingerprint data, voiceprint data, speech contents data, palm print data, iris image data, and face configuration data.

12. The electronic device of claim 9, wherein when the determining module determines the first biologic feature data does not conform to the reference biologic feature data, the electronic device remains in the locked state, and the control module is further configured to:

execute an alternative user-verifying procedure.

13. A computer-readable non-transitory medium having stored thereon instructions, which, when executed by a processor in an electronic device, cause the processor to perform operations of:

capturing a biologic feature data of a user from an input from a the user for an operation while receiving an the input when the electronic device is in a locked state;

determining whether the biologic feature data conforms to a reference biologic feature data;

switching the electronic device from the locked state into a non-locked state and directly controlling the electronic device to perform the operation according to the input when the biologic feature data is determined conforming to the reference biologic feature data;

capturing a second biologic feature data from a second user while receiving a second input from the second user for a second operation after the electronic device is switched to the non-locked state;

determining whether the second biologic feature data conforms to the reference biologic feature data; and switching the electronic device from the non-locked state into the locked state and prohibiting the electronic device from performing the second operation according to the second input when the second biologic feature data is not determined conforming to the reference biologic feature data.

* * * * *